(12) United States Patent
Sicher et al.

(10) Patent No.: US 11,601,155 B2
(45) Date of Patent: Mar. 7, 2023

(54) SYSTEM AND METHOD FOR OPTIMIZED THERMAL MANAGEMENT OF A WWAN MODEM

(71) Applicant: Dell Products L.P., Round Rock, TX (US)

(72) Inventors: Alan Eric Sicher, Taipei (TW); Mao-Sung Cheng, Taoyuan (TW)

(73) Assignee: Dell Products L.P., Round Rock, TX (US)

(*) Notice: Subject to any disclaimer, the term of this patent is extended or adjusted under 35 U.S.C. 154(b) by 175 days.

(21) Appl. No.: 17/238,401

(22) Filed: Apr. 23, 2021

(65) Prior Publication Data

US 2022/0345171 A1    Oct. 27, 2022

(51) Int. Cl.
| | |
|---|---|
| *H04B 1/401* | (2015.01) |
| *G06N 20/00* | (2019.01) |
| *G06F 11/30* | (2006.01) |
| *H04L 43/08* | (2022.01) |
| *H04L 41/16* | (2022.01) |

(52) U.S. Cl.
CPC ......... *H04B 1/401* (2013.01); *G06F 11/3058* (2013.01); *G06N 20/00* (2019.01); *H04L 41/16* (2013.01); *H04L 43/08* (2013.01)

(58) Field of Classification Search
CPC ..... H04B 1/401; G06F 11/3058; G06N 20/00; H04L 41/16; H04L 43/08; H04L 43/0817
See application file for complete search history.

(56) References Cited

U.S. PATENT DOCUMENTS

| | | | | |
|---|---|---|---|---|
| 10,819,923 | B1* | 10/2020 | McCauley | ............... G01J 5/025 |
| 2020/0382968 | A1* | 12/2020 | Gupta | ................... H04W 24/02 |
| 2021/0258804 | A1* | 8/2021 | Amini | ............... H04W 52/0206 |

* cited by examiner

*Primary Examiner* — Mohammad S Anwar
(74) *Attorney, Agent, or Firm* — Terrile, Cannatti & Chambers; Stephen A. Terrile

(57) ABSTRACT

A system of one or more computers can be configured to perform particular operations or actions by virtue of having software, firmware, hardware, or a combination of them installed on the system that in operation causes or cause the system to execute intelligent thermal management of a WWAN modem. In at least one embodiment, the temperature conditions associated with the operation of the WWAN modem and the current communication conditions of the WWAN modem are detected. The detected temperature conditions and current communication conditions are provided to an input of a trained thermal AI/ML model, which generates a set of new communication parameters. In at least one embodiment, the WWAN modem is set to operate using one or more of the new communication parameters.

20 Claims, 11 Drawing Sheets

SYSTEM AND METHOD FOR OPTIMIZED THERMAL MANAGEMENT OF A WWAN MODEM

BACKGROUND OF THE INVENTION

Field of the Invention

The present invention relates to information handling systems. More specifically, embodiments of the invention relate to a system and method for optimized thermal management of a Wireless Wide Area Network (WWAN) modem.

Description of the Related Art

As the value and use of information continue to increase, individuals and businesses seek additional ways to process and store information. One option available to users is an information handling system (IHS). An IHS generally processes, compiles, stores, and/or communicates information or data for business, personal, or other purposes, thereby allowing users to take advantage of the value of the information. Because technology and information handling needs and requirements vary between different users or applications, IHS may also vary regarding what information is handled, how the information is handled, how much information is processed, stored, or communicated, and how quickly and efficiently the information may be processed, stored, or communicated. IHS variations allow for information handling systems to be general or configured for a specific user or specific use, such as financial transaction processing, airline reservations, enterprise data storage, or global communications. Also, information handling systems may include various hardware and software components that may be configured to process, store, and communicate information and may include one or more computer systems, data storage systems, and networking systems.

IHS may use wireless networking components to communicate information over a wireless network. Wireless networks may include Wireless Wide Area Networks (WWANs). WWAN is a mobile broadband option that is used in communications over, for example, a cellular network and may comply with 5G, 4G, and other communication standards.

SUMMARY OF THE INVENTION

A system of one or more computers can be configured to perform particular operations or actions by virtue of having software, firmware, hardware, or a combination of them installed on the system that in operation causes or cause the system to execute intelligent thermal management of a WWAN modem. At least one embodiment is directed to a computer-implemented method for executing operations, including detecting temperature conditions associated with the operation of a WWAN modem in an information handling system. The current communication conditions of the WWAN modem are also detected. In at least one embodiment, the detected temperature conditions and current communication conditions are provided to an input of a trained thermal artificial intelligence/machine learning (AI/ML) model. New communication parameters using the trained thermal AI/ML model are generated at an output of the trained thermal AI/ML model. The new communication parameters are generated by the trained thermal AI/ML model using the detected temperature conditions and current communication conditions provided to the input of the trained thermal AI/ML model. In at least one embodiment, the WWAN modem is set to operate using one or more of the new communication parameters. Other embodiments of this aspect include corresponding computer systems, apparatus, and computer programs recorded on one or more computer storage devices, each configured to perform the actions of the methods.

In at least one embodiment, the detected temperature conditions associated with operation of the WWAN modem include one or more of: an ambient temperature of an operating environment proximate to the WWAN modem; a change in the ambient temperature of the operating environment proximate the WWAN modem over time; device temperatures of hardware components of the WWAN modem; and a change in device temperatures of the hardware components of the WWAN modem over time.

In at least one embodiment, the detected current communication conditions of the WWAN modem include one or more of: a communication mode of the WWAN modem; a modulation coding scheme used by the WWAN modem; a duty cycle in use for communications transmitted by the WWAN modem; a channel in use by the WWAN modem; a transmit power level in use for communications transmitted by the WWAN modem; a data throughput of current communications transmitted by the WWAN modem; a signal quality of a serving cell currently used by the WWAN modem; a distance between the WWAN modem and the serving cell currently used by the WWAN modem; a signal quality of a neighboring cell that may be used by the WWAN modem; a mobility mode of the WWAN modem; a status of the WWAN modem; and a name of a network to which the WWAN modem is connected.

In at least one embodiment, the new communication parameters provided at the output of the trained thermal AI/ML model include one or more of: a recommended communication mode for use by the WWAN modem; a recommended duty cycle for use in communications by the WWAN modem; a recommended modulation coding scheme for use in communications by the WWAN modem; a recommended transmit power level for use in communications by the WWAN modem; and a carrier aggregation technique for use in communications by the WWAN modem.

In at least one embodiment, conditions associated with an operating scenario of the information handling system are detected and provided to the input of the trained thermal AI/ML model. The detected conditions associated with the operating scenario are used by the trained thermal AI/ML model to obtain the new communication parameters from the output of the trained thermal AI/ML model.

In at least one embodiment, the detected conditions associated with the operating scenario of the information handling system include one or more of: applications currently running on the information handling system; software drivers used by the information handling system; operating system used by the information handling system; the speed of a cooling fan of the information handling system; the speed of one or more central processing units used by the information handling system; the speed of one or more graphics processing units used by the information handling system; an ambient temperature of the information handling system; and a change in the ambient temperature of the information handling system over time.

In at least one embodiment, new operating scenario conditions are obtained for use by the information handling system from the output of the trained thermal AI/ML model.

The new operating scenario conditions may include one or more of: a recommended speed for a cooling fan of the information handling system; a recommended speed for the operation of one or more central processing units of the information handling system; and a recommended speed for the operation of one or more graphics processing units of the information handling system.

In at least one embodiment, fixed parameters associated with the WWAN modem and information handling system are provided to the trained thermal AI/ML model's input. The fixed parameters may include one or more of an identification of a model of the WWAN modem, identification of hardware components of the WWAN modem, identification of a model of the information handling system; and generating the new communication parameters using the trained thermal AI/ML model at an output of the trained thermal AI/ML model using one or more of the fixed parameters.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
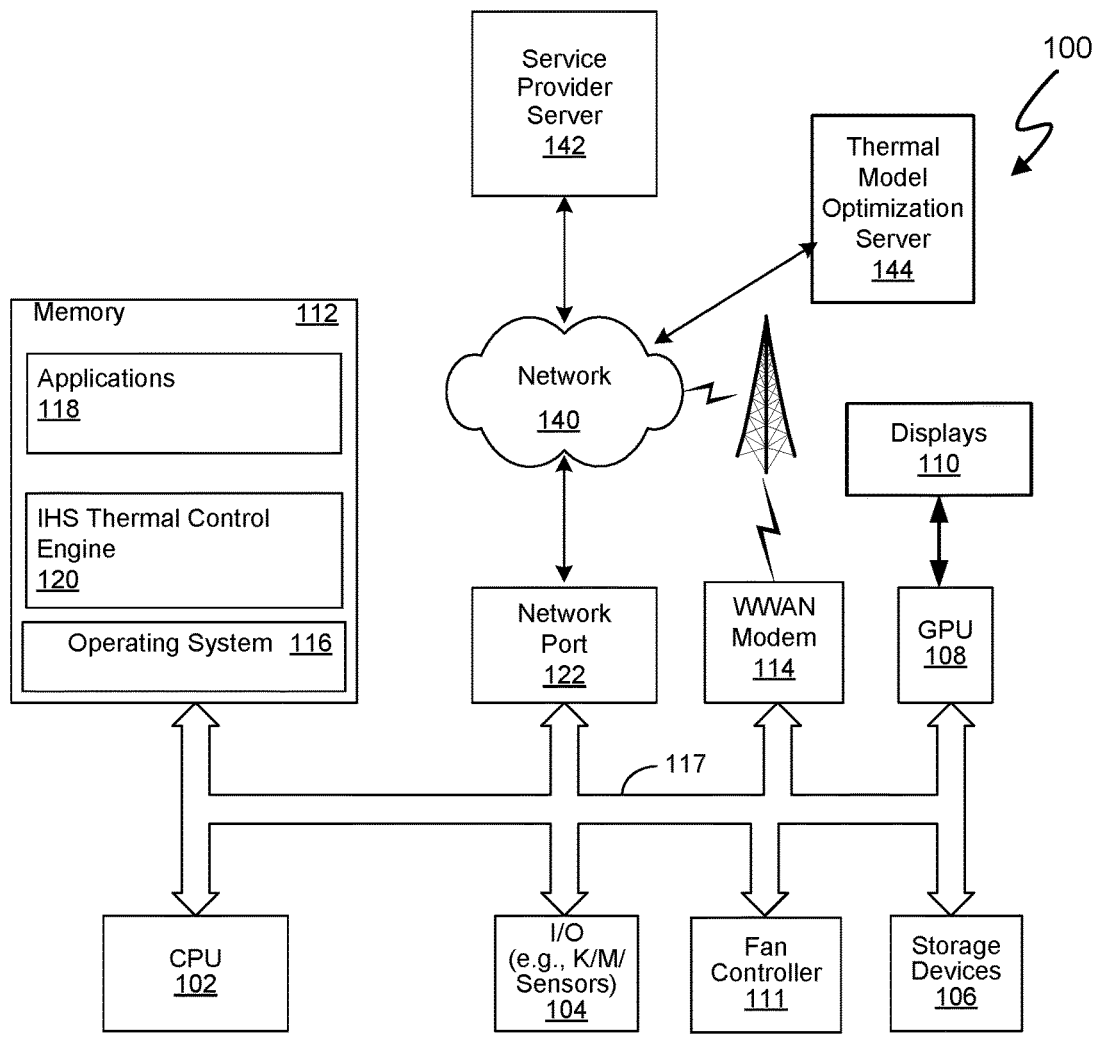
FIG. 1 is a generalized illustration of an information handling system that is configured with a WWAN modem in accordance with certain embodiments of the system and method of the present disclosure.

Systems, methods, and computer-readable mediums are disclosed for use in the thermal management of a WWAN modem. Certain embodiments are implemented with an appreciation that the thermal management of a WWAN modem in an information handling system can be achieved through intelligent selection of WWAN modem communication parameters. Such communication parameters, for example, can include the communication mode used by the WWAN modem, the duty cycle for communications used by the WWAN modem, the modulation coding scheme used by the WWAN modem, the transmit power level output of the WWAN modem communications, the carrier aggregation used in the WWAN modem communications, and other such communication parameters. In certain embodiments, recommended communication parameters are generated by a trained thermal AI/ML model that uses various current thermal and operational parameters of the WWAN modem to generate an optimized set of communication parameters that may be used by the WWAN modem and yet maintain the WWAN modem in a proper thermal operating range. In certain embodiments, the trained thermal AI/ML model may generate the optimized set based on ambient temperature conditions, device temperature conditions, current communications conditions associated with communications executed by the WWAN modem, and fixed parameters associated with the type of modem, components used in the implementation of the WWAN modem, and model of the IHS employing the WWAN modem, etc.

Certain embodiments are implemented with an appreciation that information relating to an IHS operating scenario may also be used by the trained thermal AI/ML model in recommending the set of communication parameters. Exemplary operating scenario conditions, for example, may include the number and/or type of applications running on the IHS, software drivers used by the IHS, the operating system used by the IHS, the battery level of the IHS, the speed of the cooling fan of the IHS, the speed of one or more CPUs used by the IHS, the speed of one or more graphics processing units (GPUs) used by the IHS, etc. In certain embodiments, the trained thermal AI/ML model may also provide suggestions to the IHS for the speed of the cooling fan, speed of the one or more CPUs, speed of the one or more GPUs, etc.

Various methods of obtaining training data for the thermal AI/ML model, conducting the thermal AI/ML model training, and deploying the trained thermal AI/ML model and corresponding updates are also disclosed. In certain embodiments, the thermal AI/ML model may be trained at, for example, a thermal model optimization server. Training data may be derived from multiple data sources such as, for example, crowd-sourced data from IHS employing WWAN modems operating in the field, laboratory data obtained during thermal testing of WWAN modems and/or corresponding IHS using the WWAN modems, dispatch and failure data associated with WWAN modems, thermal specifications of WWAN modems and/or modem components, etc. In certain embodiments, the thermal AI/ML model is trained at the thermal model optimization server and wirelessly deployed therefrom to WWAN modems operating in the field. In certain embodiments, multiple thermal AI/ML models are developed, where the thermal AI/ML models are specific to certain WWAN modem models, configurations, locations, etc. In certain embodiments, multiple thermal AI/ML models may be developed for specific WWAN modem/IHS combinations. The thermal AI/ML models may be updated and deployed in response to various conditions, such as periodic updating, model updating based on the degree of change of the model from currently deployed models, model updating based on the degree of change of available training data, etc. Other model updating and deployment criterion may also be used.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a desktop or laptop computer, a mobile phone, a mobile tablet device, a network storage device, an intelligent device controlling operations on a manufacturing floor, or any other suitable device. An IHS may vary in size, shape, performance, functionality, and price. The IHS may include random access memory (RAM), one or more processing resources such as a central processing unit (CPU) or hardware or software control logic, ROM, and/or other non-volatile memory types. Additional components of the IHS may include one or more disk drives, one or more network ports for communicating with external devices, as well as various input and output (I/O) devices, such as a keyboard, a mouse, and a video display. The IHS may also include one or more buses operable to transmit communications between the various hardware components.

FIG. 1 is a generalized illustration of an IHS 100 that is configured in accordance with certain embodiments of the system and method of the present disclosure. The IHS 100 includes a processor (e.g., central processor unit or "CPU") 102, input/output (I/O) devices 104, such as a display, a keyboard, a mouse, thermal sensors, and associated controllers, and a hard drive or disk storage 106. The IHS 100 may also include one or more GPUs 108 configured for control of one or more displays 110, and a fan controller 111 configured to control one or more cooling fans used to cool the IHS 100.

In various embodiments, the IHS 100 also includes network port 122 and WWAN modem 114. The network port 122 may be configured to connect to a network 140, such as the Internet or other network for access to various servers, such as service provider server 142. The WWAN modem 114 may be configured to connect to the network 140 using, for example, a mobile broadband communication standard. In certain embodiments, the WWAN modem 114 may be configured to send thermal optimization actions and outcomes to a thermal model optimization server 144 to generate training data used to train thermal AI/ML models at the thermal model optimization server 144, as more fully described herein. In certain embodiments, the WWAN modem 114 may be configured to receive updated trained thermal AI/ML models from the thermal model optimization server 144, as more fully described herein.

The IHS 100 likewise includes system memory 112, which is interconnected to the foregoing via one or more buses 117. System memory 112 further comprises an operating system (OS) 116 and user applications 118. In various embodiments, the system memory 112 may also include an IHS thermal control engine 120 that is configured to control, for example, the speed of the CPU 102, the speed of the GPU 108, and a fan connected to the fan controller 111. In certain embodiments, the IHS thermal control engine 120 is configured to communicate with the WWAN modem 114 to exchange various parameters associated with the thermal control of the IHS.

Figure 2:
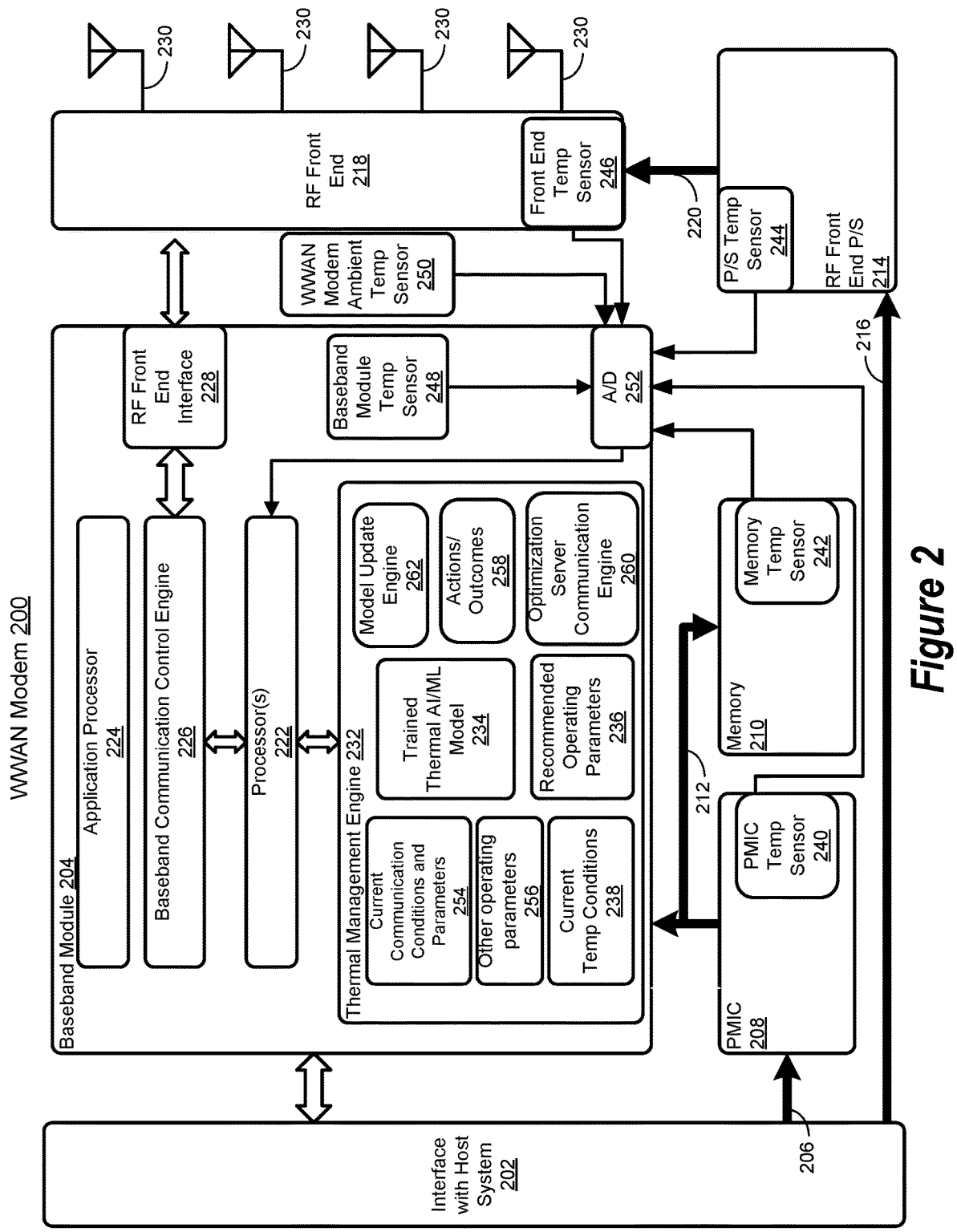
FIG. 2 depicts an exemplary embodiment of a WWAN modem that may be used to implement certain embodiments of the disclosed system.

FIG. 2 depicts an exemplary embodiment of a WWAN modem 200 that may be used to implement certain embodiments of the disclosed system. In this example, the WWAN modem 200 includes an interface 202 used to communicate with and receive power from a host system, such as IHS 100. Data communication with the host system takes place using a baseband module 204.

Power is provided from the host system over a power bus 206 to a power management integrated circuit (PMIC) 208, which distributes power to the baseband module 204 and memory 210 over power bus 212. Power is received by an RF front end power supply 214 from the host system over power bus 216, which distributes power to the RF front end 218 over power bus 220.

Certain embodiments of the WWAN modem 200 include one or more processors 222 (e.g., ARM processors or the like) and an application processor 224. In certain embodiments, such as those configured in communications systems such as a mobile phone, the application processor 224 may be configured to execute applications that interact with components such as video cameras, keyboards, smart apps, etc.

In certain embodiments, the processors 222 are configured to execute a baseband communication control engine 226. The baseband communication control engine 226 is responsible for setting the communication parameters used by the WWAN modem 200. Exemplary communication parameters include the communication mode used by the WWAN modem, the duty cycle used in communications by the WWAN modem, the modulation coding scheme used in communications by the WWAN modem, the transmit power level used in communications by the WWAN modem, and the carrier aggregation technique used in communications by the WWAN modem. The baseband communication control engine 226 may also be used to detect communication conditions such as the data throughput of communications transmitted by the WWAN modem, the signal quality of the serving cell used by the WWAN modem, the distance between the WWAN modem and the serving cell used by the WWAN modem, and the signal quality of a neighboring cell that may be used by the WWAN modem.

The baseband communication control engine 226 of this example is configured to communicate with an RF front end 218 over an RF front end interface 228. In operation, certain embodiments provide the data that is to be communicated wirelessly by RF front end 218 over antennas 230 (e.g., MIMO, e-MIMO, ng-MIMO, etc.) to other devices. Similarly, RF data received at antennas 230 is provided from the RF front end 218 to the baseband communication control engine 226 over the RF front end interface 228. In certain embodiments, the baseband communication control engine 226 determines the transmit power used by the RF front end 218 for the RF communications.

In certain embodiments, the processors 222 are also configured to execute a thermal management engine 232. The thermal management engine 232 may be stored in memory as code that is executable by the processors 222 to implement the functionality of the thermal management engine 232. In certain embodiments, the code may be stored in the onboard memory of an ARM processor, external memory (e.g., memory 210), and/or a combination of memory arranged in various configurations.

In the embodiment shown in FIG. 2, the thermal management engine 232 is configured to use a trained thermal AI/ML model 234 to generate recommended operating parameters 236 that are used by the WWAN modem 200. In certain embodiments, the recommended operating parameters 236 include one or more of 1) a recommended communication mode for use by the WWAN modem, 2) a recommended duty cycle for use in communications by the WWAN modem, 3) a recommended modulation coding scheme for use in communications by the WWAN modem, 4) a recommended transmit power level for use in communications by the WWAN modem, and 5) a carrier aggregation technique for use in communications by the WWAN modem. In certain embodiments, the recommended operating parameters may also include one or more of 1) a recommended fan speed for use by the IHS, 2) a recommended CPU speed for use by the IHS, and 3) a recommended GPU speed for use by the IHS. In certain embodiments, the recommended IHS parameters are communicated by the WWAN modem 200 to the IHS thermal control engine 120 of the IHS.

The trained thermal AI/ML model 234 calculates the recommended operating parameters 236 using the current temperature conditions 238 associated with the operation of the WWAN modem 200. In the illustrated embodiment, the current temperature conditions 238 include temperatures of the various devices as detected by a temperature sensor disposed proximate or integrated with the devices to monitor the device temperatures. To this end, the power management integrated circuit may include a PMIC temperature sensor 240. Memory 210 may include a memory temperature sensor 242. The RF front end power supply 214 may include a power supply temperature sensor 244. RF front end 218 may include a front end temperature sensor 246. Baseband module 204 may include a baseband module temperature sensor 248.

Additionally, or in the alternative, the current temperature conditions 238 may include information relating to the ambient temperature of the environment proximate the WWAN modem 200, as detected by WWAN modem ambient temperature sensor 250, and the ambient temperature of the IHS, as detected by a sensor disposed in the IHS environment and communicated to the WWAN modem 200 over interface 202. In the example shown in FIG. 2, the outputs of the temperature sensors are analog signals that are provided to the input of an analog-to-digital converter 252, which converts the analog signals to digital data corresponding to the detected device and/or ambient temperatures for storage in the current temperature conditions 238. In certain embodiments, the current temperature conditions 238 may include time-series temperature data provided to the trained thermal AI/ML model 234 for use in determining ambient temperature changes and device temperature changes over time. The temperature changes over time, in turn, may be used by the trained thermal AI/ML model 234, along with the other current temperature conditions, in the prediction of the recommended operating parameters 236.

Certain embodiments of the trained thermal AI/ML model 234 use current communication conditions and current communication parameters 254 in generating the recommended operating parameters 236. To this end, certain embodiments of the thermal management engine 232 detect current communication parameters in use by the WWAN modem 200. For example, the detected current communication parameters may include the communication mode in use by the WWAN modem (e.g., 4G, 5G-FR1, 5G-FR2). For example, the trained thermal AI/ML model 234 may recommend a rollback to 4G from FR1, or to FR1 from FR2 when the device is moving, depending on which communication mode is likely to provide the better coverage yet maintain the thermal conditions of the WWAN modem 200 within defined temperature limits. The thermal management engine 232 may also detect other current communication parameters in use by the WWAN modem 200, including one or more of 1) the duty cycle in use for communications transmitted by the WWAN modem, 2) the channel in use by the WWAN modem, 3) the transmit power level in use for communications transmitted by the WWAN modem, 4) the carrier aggregation technique in use for communications by the WWAN modem, 5) the modulation coding scheme in use for communications by the WWAN modem. The thermal management engine 232 may also detect current communication conditions for provision to the trained thermal AI/ML model 234, including one or more of 1) the data throughput of current communications transmitted by the WWAN modem, 2) the signal quality of the serving cell currently used by the WWAN modem, 3) the distance between the WWAN modem and the serving cell currently used by the WWAN modem, and 4) the signal quality of a neighboring cell that the WWAN modem may use.

Other current communication conditions may also be used. In one example, a mode information may be provided to the trained thermal AI/ML model 234. Examples of such mobility mode information may include information as to whether the IHS is stationary, moving slowly, moving quickly as determined from, for example, GNSS, A-GPS, etc. Mobility mode information may useful to predict the rate of power changes, channel changes, etc. The status of the WWAN modem (e.g., disabled, idle, camping, active context, etc.) may also be provided to the trained thermal AI/ML model 234. Still further, the name of the network to which the trained thermal WWAN modem is connected may be provided to the AI/ML model 234. In certain embodiments, knowing the network and/or network operator may have a correlation with coverage and network quality that can be used by the trained thermal AI/amount model 234.

Certain embodiments of the trained thermal AI/ML model 234 also use other operating parameters 256 in generating the recommended operating parameters 236. In certain embodiments, the other operating parameters include detected conditions associated with the operating scenario of the IHS. Such detected conditions may include one or more of 1) applications currently running on the information handling system (e.g., the identities and/or the number of running applications), 2) software drivers used by the IHS, 3) operating system used by the IHS, 4) the speed of a cooling fan of the IHS, 5) the speed of one or more central processing units used by the IHS, and 6) the speed of one or more graphics processing units used by the IHS.

In certain embodiments, the other operating parameters 256 also include fixed parameters associated with the WWAN modem 200 and IHS. The fixed parameters may include one or more of 1) data identifying the model of the WWAN modem, 2) data identifying the hardware components of the WWAN modem (e.g., part numbers), and 3) data identifying the model of the IHS (e.g., the model number of the desktop, laptop, mobile phone, etc.).

As described in further detail herein, certain embodiments of the WWAN modem 200 are configured to communicate with a thermal model optimization server. To this end, the thermal management engine 232 may include an optimization server communication engine 260 that is configured to facilitate communications between the WWAN modem 200 and the thermal model optimization server. The communications may be implemented using a layered protocol as described in further detail herein.

In certain embodiments, the WWAN modem 200 communicates action and outcome information 258 to the thermal model optimization server for use in generating and/or updating thermal AI/ML models at the thermal model optimization server. The action and outcome information 258 may include actions that were implemented by the WWAN modem 200 using one or more of the recommended operating parameters 236. As an example, the trained thermal AI/ML model 234 may have recommended a specific communication mode and modulation scheme, which are then implemented by the WWAN modem 200. When the WWAN modem 200 implements the recommended communication mode and modulation scheme, the implemented communication mode and modulation scheme may be recorded as actions in the action and outcome information 258. In furtherance of this example, the outcome information may include the temperature conditions (e.g., device temperatures, ambient temperatures, etc.) associated with the operation of the WWAN modem 200 that are present once the WWAN modem 200 implements the recommended actions (e.g., the temperature conditions existing after a period of time has elapsed from the time at which the recommended actions were implemented). In certain embodiments, therefore, the actions include recommendations that are implemented by the WWAN modem 200, while outcomes include the temperature conditions that occur as a result of the implemented actions.

In the example shown in FIG. 2, the trained thermal AI/ML models generated at the thermal model optimization server may be deployed to update the trained thermal AI/ML model 234 with modifications to the existing trained thermal AI/ML model 234. Additionally, on the alternative, the update may include a new trained thermal AI/ML model that is to replace the existing trained thermal AI/ML model 234. To this end, certain embodiments of the thermal management engine 232 may include a model update engine 262 configured to implement model updates received from the thermal model optimization server at the optimization server communication engine 260.

Figure 3:
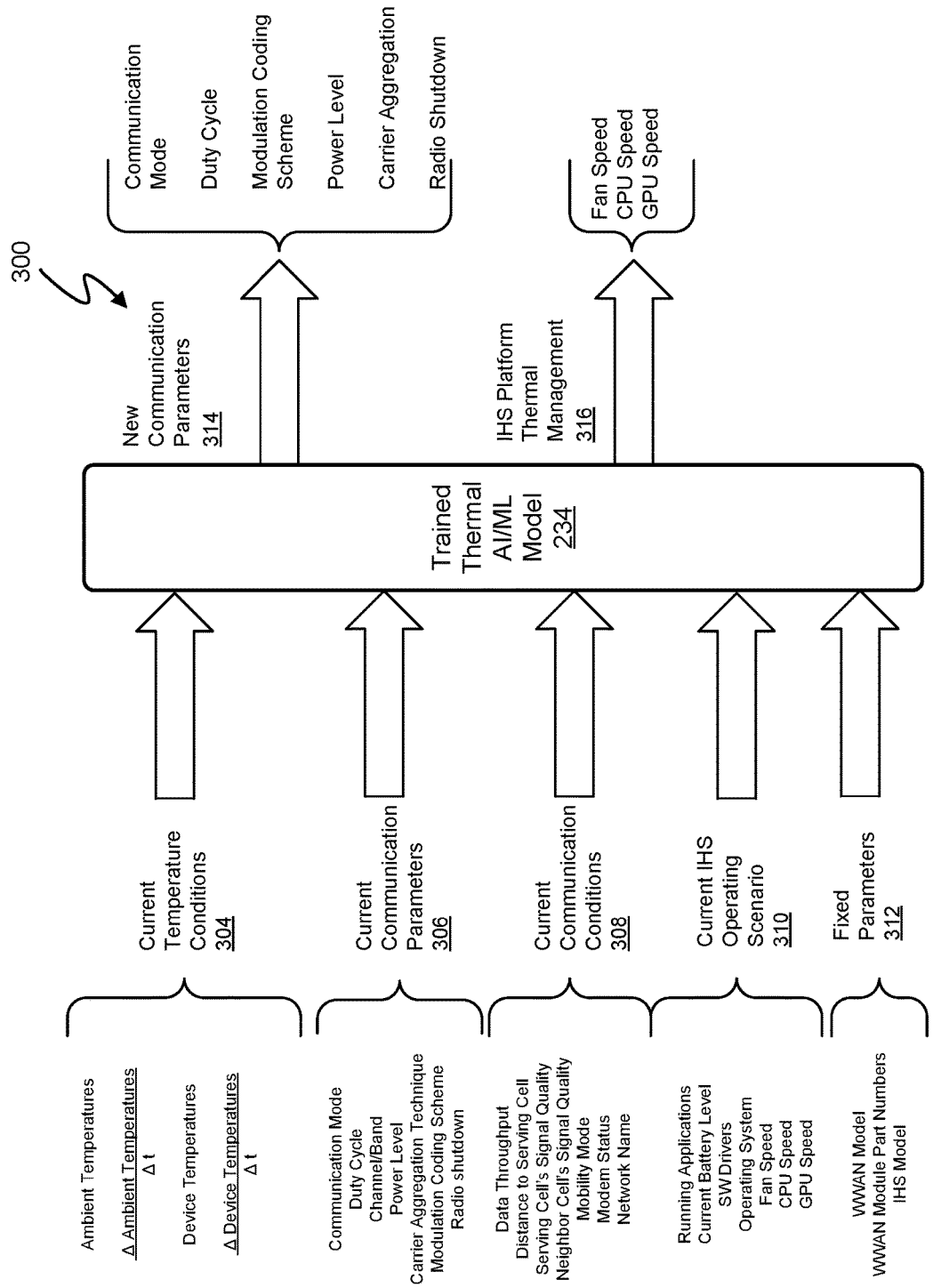
FIG. 3 is a block diagram showing one example of the type of information that may be input to and output from a trained thermal AI/ML model implemented in accordance with certain embodiments of the disclosed system.

FIG. 3 is a block diagram 300 showing one example of the type of information that may be input to and output from a trained thermal AI/ML model 234 implemented in accordance with certain embodiments of the disclosed system. The trained thermal AI/ML model 234 may be implemented using a supervised learning model, such as a Support Vector Machine (SVM). Other supervised learning models may also be used to implement the trained thermal AI/ML model 234. Examples of other such supervised learning models include 1) linear regression models, 2) decision tree models, 3) classification and regression tree models (CART), 4) adaptive-boost models, and 5) information gain models. Certain embodiments of the trained thermal AI/ML model 234 may be implemented using a cascaded combination of different supervised learning models. Additionally, or in the alternative, certain embodiments of the trained thermal AI/ML model 234 may be implemented using a combination of different supervised learning models operating in parallel. Additionally, or on the alternative, certain embodiments of the trained thermal AI/ML model 234 may be implemented using a combination of different series and parallel connected supervised learning models.

The exemplary trained thermal AI/ML model 234 shown in FIG. 3 is configured to receive a wide range of data used to generate recommended operating parameters for use by the WWAN modem 200. In certain embodiments, the input data includes data relating to the current operating temperature conditions 302 of the WWAN modem 200. As shown in FIG. 3, the current operating temperature conditions may include ambient temperatures, changes in the ambient temperatures over time, device temperatures, changes in the device temperature over time, etc. It will be recognized, based on the teachings of the present disclosure, that the foregoing current temperature conditions constitute non-limiting examples of such conditions and that a greater number, fewer number, or different temperature conditions may be utilized.

In certain embodiments, the input data includes data relating to the current communication parameters 306 that are in use by the WWAN modem 200. As shown in FIG. 3, the current communication parameters 306 may include one or more of 1) the communication mode in use by the WWAN modem 200, 2) the duty cycle of the communications in use by the WWAN modem 200, 3) the channel/band in use by the WWAN modem 200, 4) the transmit power level used in the communications executed by the WWAN modem 200, 5) the carrier aggregation technique used by the WWAN modem 200, 6) the modulation coding scheme used by the WWAN modem 200, and 7) whether the radio on the WWAN modem 200 has been shut down. It will be recognized, based on the teachings of the present disclosure, that the foregoing current communication parameters constitute non-limiting examples of such parameters and that a greater number, fewer number, or different parameters may be utilized as inputs to the trained thermal AI/ML model 234.

In certain embodiments, the input data includes data relating to the current communication conditions 308 between the WWAN modem 200 and the server cell in use by the WWAN modem 200 and/or neighboring cells that are accessible to the WWAN modem 200. As shown in FIG. 3, the current communication conditions 308 may include data relating to one or more of 1) the data throughput of the communications, 2) the distance between the WWAN modem 200 and the serving cell, 3) the signal quality of the serving cell, 4) the signal quality of a neighboring cell accessible by the WWAN modem 200, 5) mobility mode of the IHS, 6) status of the WWAN modem, and 7) the name of the network to which the WWAN modem is connected. It will be recognized, based on the teachings of the present disclosure, that the foregoing current communication conditions constitute non-limiting examples of such conditions and that a greater number, fewer number, or different conditions may be utilized as inputs to the trained thermal AI/ML model 234.

In certain embodiments, the input data may include data relating to the current IHS operating scenario 310. As shown in FIG. 3, the current IHS operating scenario 310 may include data relating to one or more of 1) the number, identity, and/or type of applications currently running on the IHS, 2) the current battery level of the IHS, 3) the number, identity, and/or type of software drivers currently running on the IHS, and 4) the operating system currently executed on the IHS. In certain embodiments, the current IHS operating scenario 310 may include data relating to thermal controls implemented by the IHS. In the example shown in FIG. 3, the data relating to such thermal controls may include one or more of 1) the speed(s) of one or more cooling fans controlled by the IHS, 2) the speed(s) of one or more CPUs used by the IHS, and 3) the speed(s) of one or more GPUs used by the IHS. It will be recognized, based on the teachings of the present disclosure, that the foregoing current IHS operating scenario conditions constitute non-limiting examples of such conditions and that a greater number, fewer number, or different conditions may be utilized as inputs to the trained thermal AI/ML model 234.

In certain embodiments, the input data may include data relating to fixed parameters 312 associated with the components of the WWAN modem 200 and/or the IHS. In the example shown in FIG. 3, the data relating to the fixed parameters may include one or more of 1) an identification of the model of the WWAN modem 200, 2) an identification of the parts (e.g., part numbers, part types, etc.) used in the WWAN modem 200, and 3) an identification of the model of the IHS using the WWAN modem 200. It will be recognized, based on the teachings of the present disclosure, that the foregoing fixed parameters constitute non-limiting examples of such parameters and that a greater number, fewer number, or different set of fixed parameters may be utilized as inputs to the trained thermal AI/ML model 234.

The trained thermal AI/ML model 234 uses the information provided at the model input to generate a set of recommended operating parameters. In certain embodiments, the recommended operating parameters include a recommendation of new communication parameters 314 that may be implemented by the WWAN modem 200. In the example shown in FIG. 3, the new communication parameters 314 may include one or more of 1) a recommended communication mode for use by the WWAN modem 200, 2) a recommended duty cycle for use in communications executed by the WWAN modem 200, 3) a recommended modulation coding scheme for use in communications executed by the WWAN modem 200, 4) a recommended transmit power level for use in communications executed by the WWAN modem 200, 5) a recommended carrier aggregation mode for use in communications executed by the WWAN modem 200, and 6) radio shutdown. It will be recognized, based on the teachings of the present disclosure, that the foregoing new communication parameters constitute non-limiting examples of such communication parameters and that a greater number, fewer number, or different communication parameters may be recommended at the output of the trained thermal AI/ML model 234.

In certain embodiments, the trained thermal AI/ML model 234 may recommend that the IHS implement certain IHS platform thermal management controls 316. In the example shown in FIG. 3, the IHS platform thermal management controls 316 may include one or more of 1) the speed(s) of one or more cooling fans controlled by the IHS, 2) the speed(s) of one or more CPUs used by the IHS, and 3) the speed(s) of one or more GPUs used by the IHS. It will be recognized, based on the teachings of the present disclosure, that the foregoing recommended thermal management controls constitute non-limiting examples of such controls and that a greater number, fewer number, or different thermal management controls may be recommended to the IHS at the output of the trained thermal AI/ML model 234.

Figure 4:
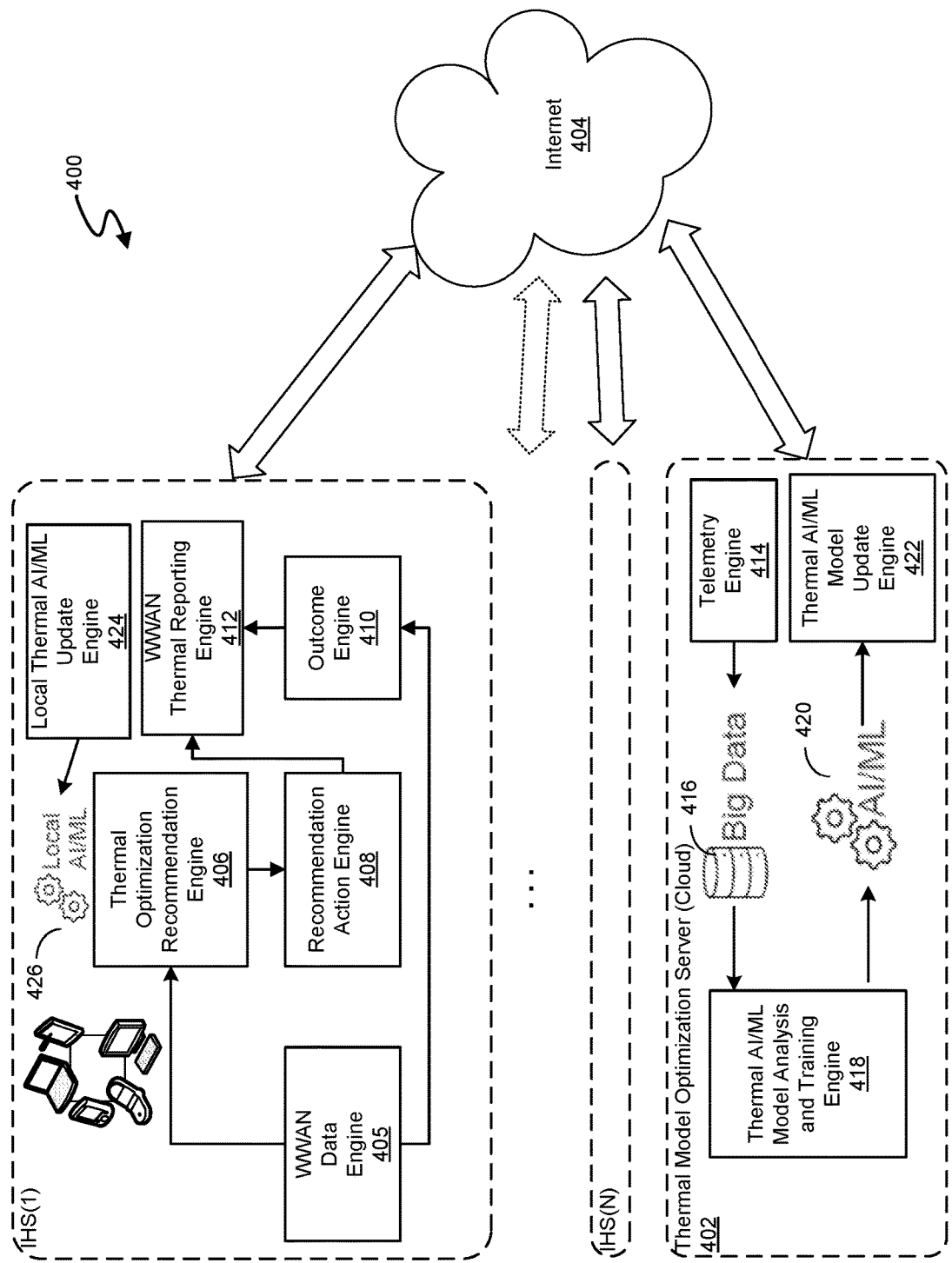
FIG. 4 shows an exemplary crowd-sourcing environment in which multiple IHSs provide thermal management data for use in updating thermal AI/ML models at a thermal model optimization server.

FIG. 4 shows an exemplary crowd-sourcing environment 400 in which multiple IHSs provide thermal management data for use in updating thermal AI/ML models at a thermal model optimization server. In this example, multiple IHSs (IHS(1) through IHS(N), where 1 through N are index numbers designating individual IHS) communicate with a thermal model optimization server 402 over a network, such as the Internet 404. The IHS may be IHS of the same or different types (e.g., laptop, desktop, tablet, smartphone, etc.). Each IHS includes a WWAN modem and is configured with a corresponding intelligent thermal management system for thermally managing the WWAN modem in the manner described herein. In this example, each IHS includes a WWAN data engine 405 that is responsible for keeping track of the current data used by a thermal optimization recommendation engine 406. The thermal optimization recommendation engine 406 includes a local trained thermal AI/ML model, which generates recommended actions for thermally managing the WWAN modem. In certain embodiments, the recommended actions are provided to a recommendation action engine 408, which is configured to execute one or more of the recommended actions. In certain embodiments, the recommendation action engine 408 executes all actions recommended by the thermal optimization recommendation engine 406. However, in certain embodiments, the recommendation action engine 408 may selectively execute only certain of the recommended actions, for example, based on user-defined logic.

In the example shown in FIG. 4, the executed actions may result in corresponding changes to the data monitored by the WWAN data engine 405. Such changes may be reported to an outcome engine 410. The actions taken by the recommendation action engine 408 and the outcomes reported to the outcome engine 410 may be correlated with one another by a WWAN thermal reporting engine 412. The WWAN thermal reporting engine 412 provides the correlated data to the thermal model optimization server 402. In certain embodiments, the WWAN thermal reporting engine 412 provides the correlated data to the thermal model optimization server 402 over the Internet 404 using a predefined communication protocol, such as the exemplary communication protocol described in detail herein.

In the example shown in FIG. 4, the thermal model optimization server 402 receives data from the WWAN thermal reporting engines of the multiple IHSs at a telemetry engine 414, which may consolidate and store the data from the multiple IHSs as big data 416. The big data 416 is accessed by a thermal AI/ML model analysis and training engine 418, which generates one or more updated trained thermal AI/ML models 420. The trained thermal AI/ML models are deployed to one or more of the IHS by a thermal AI/ML model updated engine 422, and are received over the Internet 404 by local thermal AI/ML update engines 424 of the individual IHS. In turn, the local thermal AI/ML update engines 424 update the respective local thermal AI/ML models 426 used by the thermal optimization recommendation engine 406.

The thermal model optimization server 402 may generate one or more trained AI/ML models 420 for deployment to the IHS. In certain embodiments, a trained thermal AI/ML model 420 may be respectively generated for each IHS. In certain embodiments, a common trained thermal AI/ML model 420 may be generated for individual groups of IHS. In certain embodiments, IHS having similar characteristics are grouped and assigned a common trained thermal AI/ML model 420. For example, a common trained thermal AI/ML model 420 may be generated for all IHS having similar configurations. IHS having similar configurations may be grouped based on having 1) the same or similar IHS model, 2) the same or similar WWAN modem model, and/or 3) IHS having WWAN modems implemented using the same devices. In another example, a common trained thermal AI/ML model 420 may be generated for all IHS operating in similar environments. For example, a common trained thermal AI/ML model 420 may be generated for 1) IHS operating in a given location or area, 2) IHS operating in areas having similar climate characteristics, and/or 3) IHS operating in areas having similar physical characteristics (e.g., similar types of buildings, similar types of obstructions, similar elevation levels, similar communication cell structures, etc.). It will be recognized, based on the teachings of the present disclosure, that the foregoing IHS groupings constitute non-limiting examples of such controls and that a greater number, fewer number, or different criterion may be utilized for such grouping.

Figure 5:
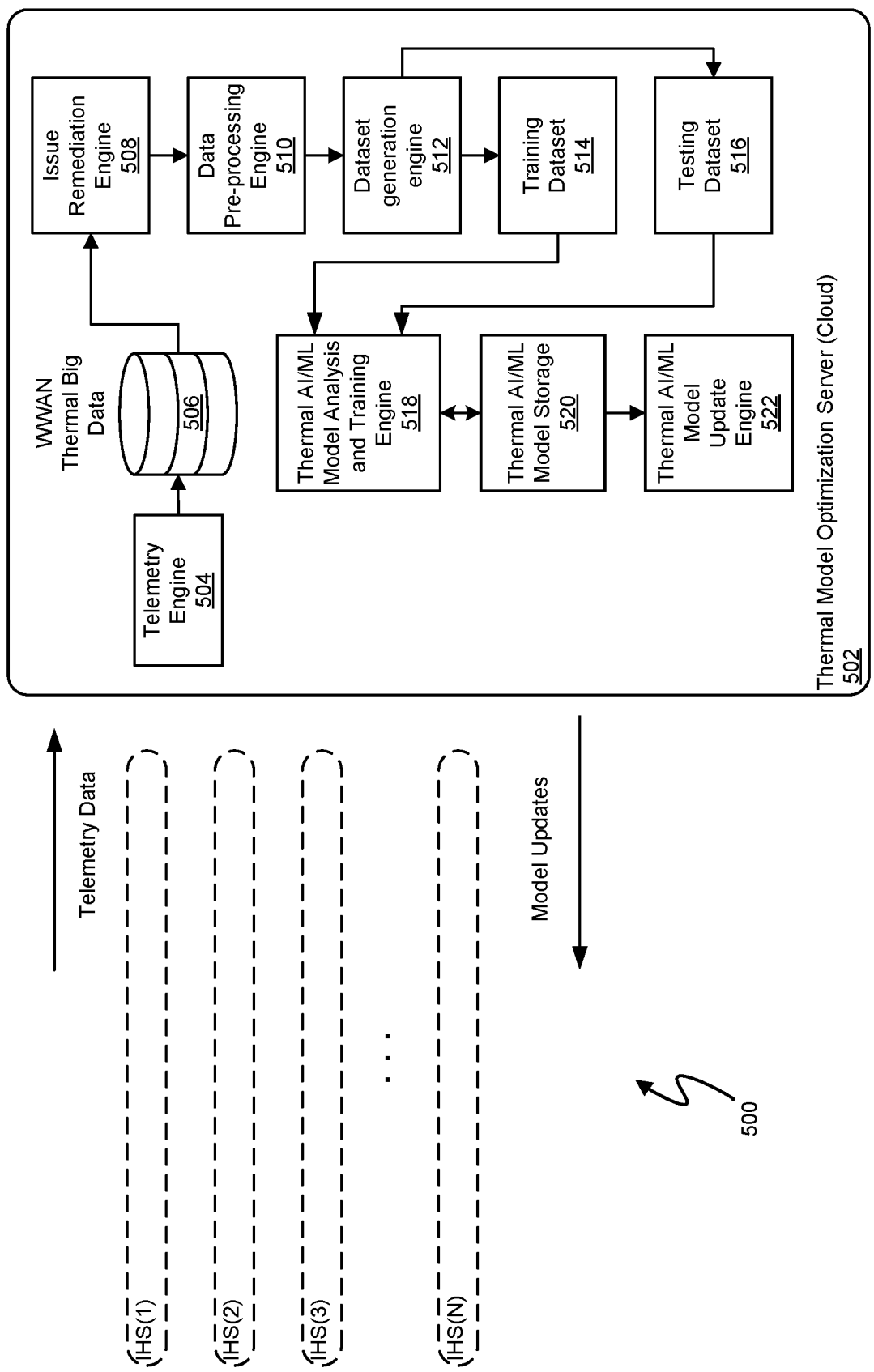
FIG. 5 shows an exemplary electronic environment in which certain embodiments of a thermal model optimization server may operate.

FIG. 5 shows an exemplary electronic environment 500 in which certain embodiments of a thermal model optimization server 502 may operate. In this example, telemetry data generated at the WWAN thermal reporting engine of each IHS is communicated to a telemetry engine 504 of the thermal model optimization server 502. In certain embodiments, the telemetry engine 504 stores the telemetry data in WWAN thermal big data storage 506. When the thermal model optimization server is ready to generate an updated thermal AI/ML model, data that is to be used in the update operations are accessed by an issue remediation engine 508. The issue remediation engine 508 resolves any data error issues (e.g., removing empty data, removing improperly formatted data, removing out-of-range data, etc.) before providing the remediated data to a data pre-processing engine 510. In certain embodiments, the data pre-processing engine 510 arranges the data in a predetermined format for use by a dataset generation engine 512, which divides the data into a training dataset 514 and testing dataset 516.

The exemplary thermal model optimization server 502 shown in FIG. 5 includes a thermal AI/ML model analysis and training engine 518, which is configured to access thermal AI/ML models stored in thermal AI/ML model storage 520. In certain embodiments, the thermal AI/ML model analysis and training engine 518 updates previously trained thermal models stored in the thermal AI/ML model storage 520 using the training dataset 514 and tests the updated thermal AI/ML model using the testing dataset 516. Once the thermal AI/ML model has been adequately updated and tested, a updated thermal AI/ML model is stored in the thermal AI/ML model storage 520, where it is accessible by a thermal AI/ML model update engine 522. The thermal AI/ML model update engine 522 sends the updated thermal AI/ML model to each IHS that is to receive the updated thermal AI/ML model.

As noted herein, the thermal AI/ML model analysis and training engine 518 may update (e.g., generate a new thermal AI/ML model, optimize an existing thermal as/model, etc.) multiple thermal AI/ML models and store the updated models in thermal AI/ML model storage 520. The updated models in the thermal AI/ML model storage 520 may be correlated with corresponding individual IHS and/or IHS groups for deployment by the thermal AI/ML model update engine 522. Model deployment may be executed by the thermal AI/ML model update engine 522 in response to various criterion (e.g., periodic deployment, scheduled deployment, immediate deployment upon model update, deployment after a predetermined time from the last update of a given thermal AI/ML update, update requests from one or more IHS, etc.).

Figure 6:
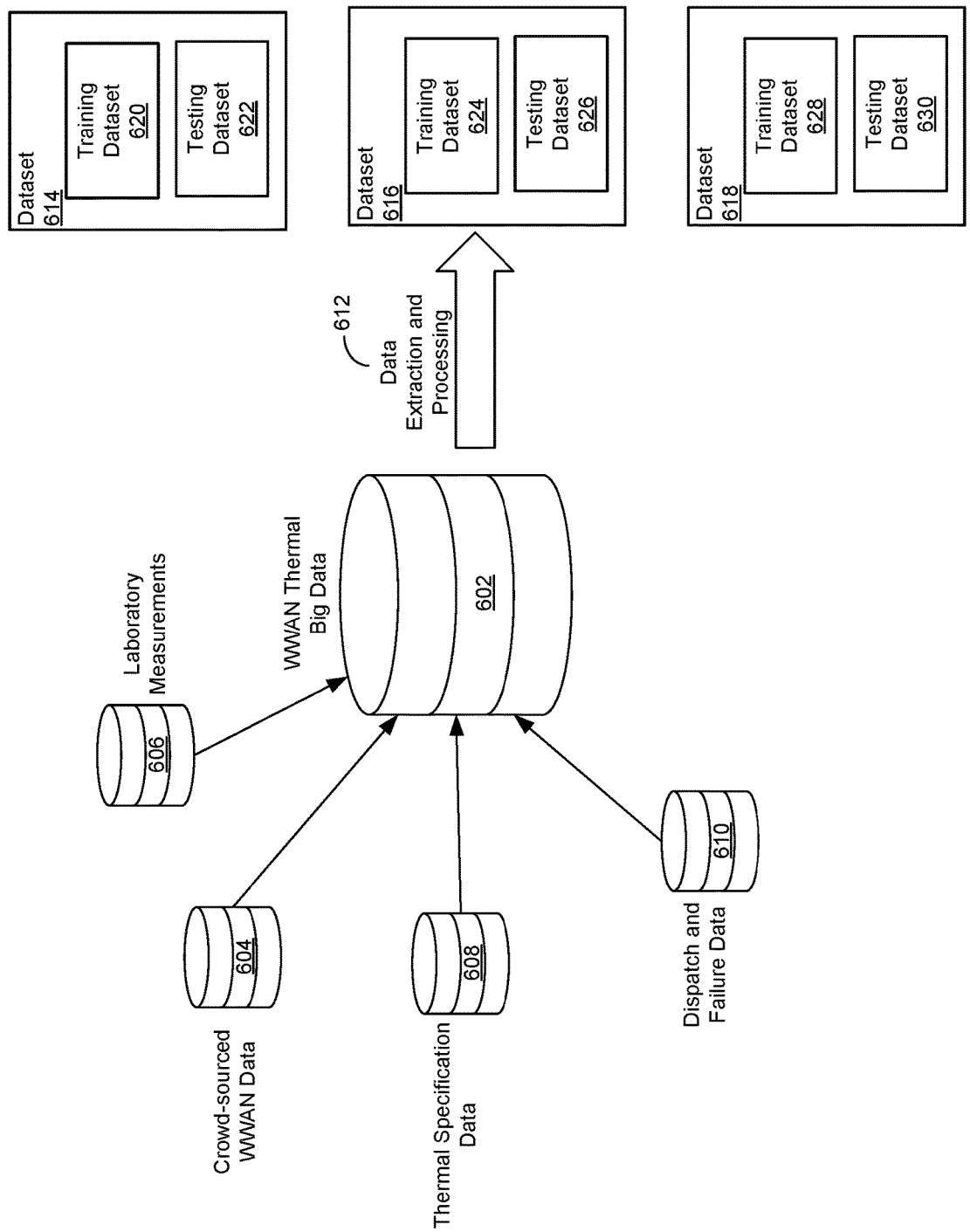
FIG. 6 depicts various data sources that may be used to generate WWAN thermal big data used to derive thermal AI/ML model training and testing datasets.

FIG. 6 depicts various data sources that may be used to generate WWAN thermal big data 602. As in the previously described examples, WWAN thermal big data 602 may include crowd-sourced WWAN data 604 obtained from multiple IHSs. In certain embodiments, however, the WWAN thermal big data 602 may also include data provided from other sources. In the example shown in FIG. 6, the WWAN thermal big data 602 includes laboratory measurements 606. In certain embodiments, the laboratory measurements may include measurements of temperatures associated with a WWAN modem while conducting communications with predetermined communication parameters under specified environmental and ambient temperature conditions. In one example, the laboratory measurements 606 include measurements taken during testing of specific WWAN modem configurations for which thermal AI/ML models are to be generated (e.g., newly generated, updated, etc.).

Certain embodiments also include thermal specification data 608 in the WWAN thermal big data 602. The thermal specification data 608 may include information such as maximum device temperatures, operating temperature ranges of devices, operating temperature ranges of WWAN modem models, operating temperature ranges of IHSs, etc. Such thermal specification data may be obtained empirically during laboratory testing and/or provided by manufacturers.

Certain embodiments also include dispatch and failure data 610 in the WWAN thermal big data 602. The dispatch and failure data 610 may include information relating to the failure and/or repair of WWAN modem models. Such data may be obtained, for example, from service records maintained by manufacturers of the WWAN modems, manufacturers of IHSs including WWAN modems, and/or organizations servicing such WWAN modems and/or IHSs.

In the example shown in FIG. 6, the WWAN thermal big data 602 undergoes data extraction and processing operations 612 to generate datasets 614, 616, and 618. In certain embodiments, each dataset 614, 616, and 618 is used to train and test a corresponding thermal AI/ML model. To this end, dataset 614 includes a training dataset 620 and testing dataset 622 that are used to test and train a first thermal AI/ML model. Dataset 616 includes a training dataset 624 and testing dataset 626 that are used to test and train a second thermal AI/ML model. Dataset 618 includes a training dataset 628 and testing dataset 630 that are used to test and train a third thermal AI/ML model. As will be understood in view of the teachings of the present disclosure, additional datasets may be extracted and processed to test and train additional thermal AI/ML models.

Figure 7:
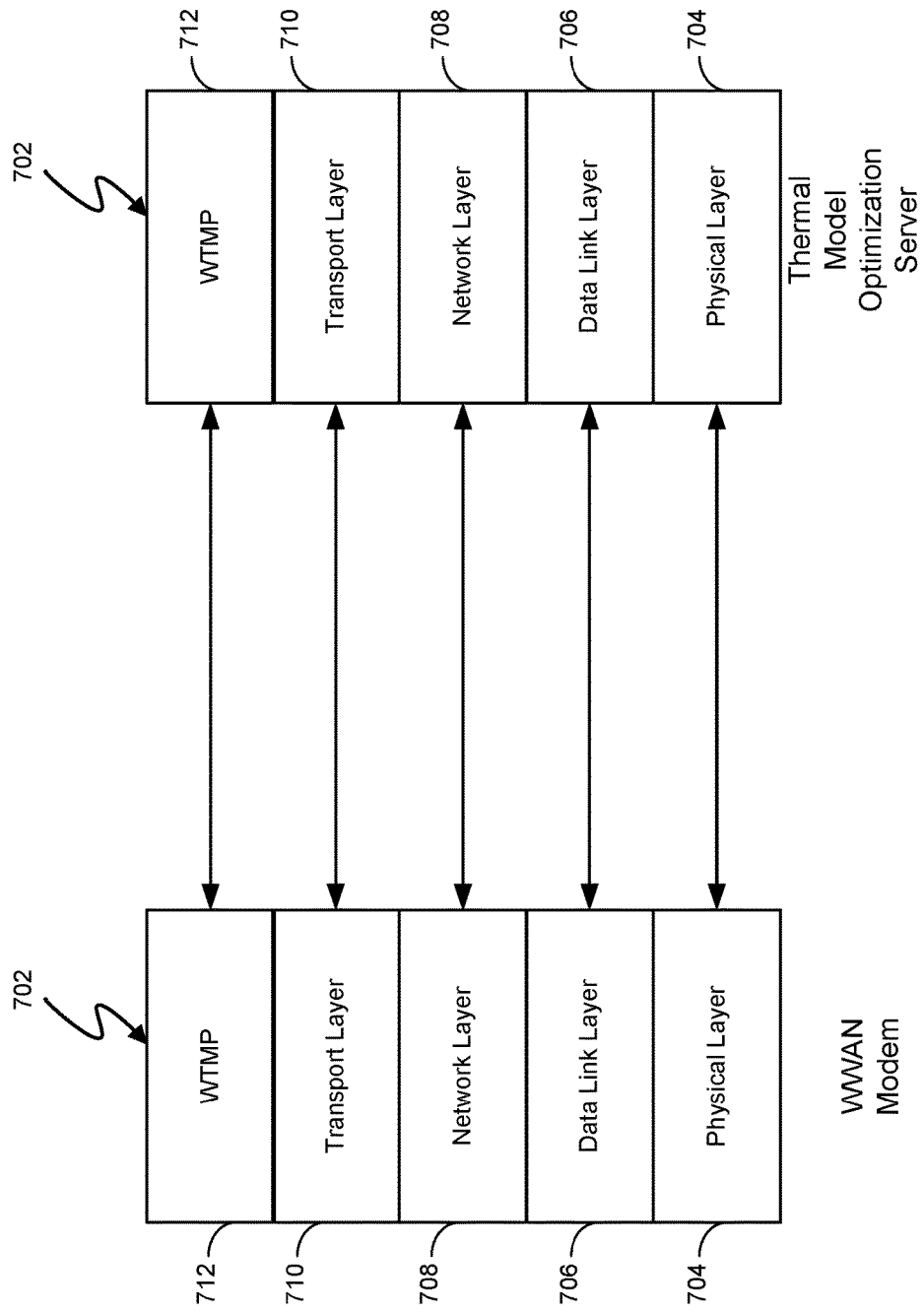
FIG. 7 shows one example of a communication protocol that may be used in communications between a WWAN modem and a thermal model optimization server.

As noted herein, the IHSs may communicate with the thermal model optimization server using a predetermined communication protocol. FIG. 7 shows one example of a communication protocol that may be used in such communications. In this example, communications between the WWAN modem and thermal model optimization server take place using a protocol stack 702 modeled after a conventional TCP/IP protocol. In certain embodiments, the protocol stack 702 includes elements common to a TCP/IP stack. To this end, the protocol stack 702 includes a link layer 704, a data link layer, a network layer, and a transport layer. In certain embodiments, however, the application layer of the TCP/IP stack is replaced with a WWAN Thermal Message Protocol (WTMP) layer 712. The WTMP layer includes messages used to communicate thermal reporting data and thermal AI/ML model updates between the WWAN modem and the thermal model optimization server.

Figure 8:
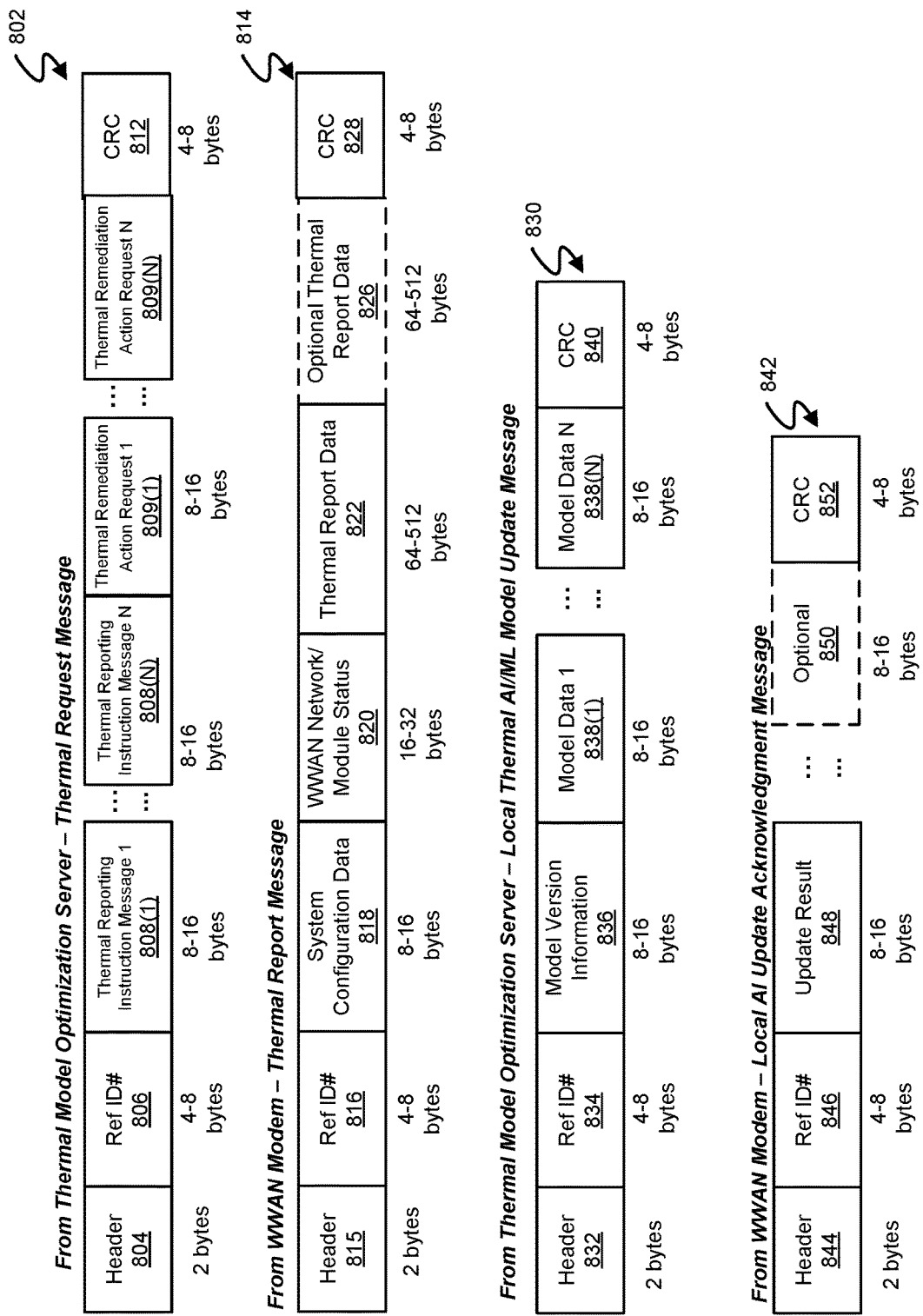
FIG. 8 shows an exemplary protocol for various messages communicated between the WWAN modem and the thermal model optimization server using the WTMP layer shown in FIG. 7.

FIG. 8 shows an exemplary protocol for various messages communicated using the WTMP layer 712. One example of the format of a request by the thermal model optimization server for action and outcome information from the WWAN modem is shown in thermal request message 802. In this example, the thermal request message 802 begins with a header 804 (e.g., 2 bytes), which provides a list of technical details about the message, such as an identification of the thermal model optimization server sending the message, an identification of the WWAN modem to which the request is made, a timestamp, etc. The header 804 is followed by a reference identification number field 806 (e.g., 4-8 bytes) containing an identification number assigned by the thermal model optimization server to the thermal request message 802. In certain embodiments, the thermal request message 802 may include requests for report data relating to specific actions taken by the WWAN modem while being managed by a thermal management engine. To this end, the thermal request message 802 in the example includes one or more thermal reporting instruction message fields 808(1) through 808 (N) (8-16 bytes each) and one or more thermal remediation action fields 809(1) through 809(N) (e.g., 8-16 bytes each). In certain embodiments, information in the thermal reporting instruction message field 808 can specify, for example, one or more of 1) the frequency with which the WWAN modem is to provide thermal reports to the thermal model optimization server, and 2) conditions and thresholds of parameters (e.g., parameters such as those shown at 304 through 312 of FIG. 3) defining when the WWAN modem should provide a thermal report to the thermal model optimization server. In certain embodiments, the thermal reporting instructions can specify instructions for filtering and pre-processing the thermal information in the WWAN modem before sending a thermal report to the thermal model optimization server.

In certain embodiments, the thermal remediation action fields 809 include instructions to the WWAN modem that includes remedial actions that are to be taken by the WWAN modem if certain conditions and/or thresholds are met at the WWAN modem. In certain embodiments, the actions can direct the WWAN modem to apply new communication parameters such as those shown at 304 of FIG. 3. For example if ambient and module temperature reach threshold x and y, respectively and transmission power and duty cycle are above u and v, then decrease duty cycle to v_target. The thermal request message 802 may end with an error check code, such as a cyclical redundancy check field 812 (e.g., 4-8 bytes).

An exemplary format for a thermal report message 814 is also shown in FIG. 8. In certain embodiments, the WWAN modem sends a thermal report message 814 in response to a thermal request message 802. In this example, the thermal report message 814 begins with a header 815 (e.g., 2 bytes), which provides a list of technical details about the message, such as an identification of the thermal model optimization server to which the message is sent, and identification of the WWAN modem sending the message, a timestamp, etc. The header 815 is followed by a reference identification number field 816 (e.g. 4-8 bytes) containing the same identification number as the thermal request message 802 to which the thermal report message 814 is responding.

In certain embodiments, the reference identification number field 816 is followed by a system configuration data field 818 (e.g., 8-16 bytes). The system configuration data field 818 includes information relating to the configuration of the WWAN modem. Such configuration information may include an identification of the WWAN modem model, an identification of the devices used to implement the WWAN modem, an identification of the IHS model incorporating the WWAN modem, etc.

In certain embodiments, the system configuration data field 818 is followed by a WWAN network/module status field 820 (e.g., 16-32 bytes). The data in the WWAN network/module status field 820 may include information relating to errors experienced by the WWAN modem in attempting to connect with an identified network, errors experienced by the WWAN modem while operatively connected to an identified WWAN network, hardware errors experienced by the WWAN modem during operation, etc.

In certain embodiments, the WWAN network/module status field 820 may be followed by a thermal report data field 822 (e.g., 64-512 bytes). As an example, the thermal report data field 822 may include outcomes resulting from actions identified in the thermal remediation action request fields 809 of the thermal request message 802.

In certain embodiments, the thermal report data field 822 is followed by one or more optional thermal report data field 826 (e.g., 64-512 bytes). The thermal report message 814 may end with an error check code, such as a cyclical redundancy check field 828 (e.g., 4-8 bytes), which follows the optional thermal report data field 826.

One example of the format of a message generated by the thermal model optimization server pursuant to updating the thermal AI/ML model of a WWAN modem is shown in model update message 830. In this example, the model update message begins with a header 832 (e.g., 2 bytes), which provides a list of technical details about the message, such as an identification of the thermal model optimization server sending the message, an identification of the WWAN modem to which the update message is directed, a timestamp, etc. The header 832 is followed by a reference identification number field 834 (e.g. 4-8 bytes) containing an identification number assigned by the thermal model optimization server to the model update message 830.

In certain embodiments, the reference identification number field 834 is followed by a model version information field 836 (e.g., 8-16 bytes). The model version information field 836 includes information identifying the model version of the thermal AI/ML model that is to be updated by the WWAN modem. Such identifying information may include the version number of the updated model, a date and timestamp associated at which the updated model was generated at the thermal model optimization server, etc.

In certain embodiments, the model version information field 836 is followed by data used by the WWAN modem to update its thermal AI/ML model. To this end, the model update message 830 includes a plurality of model data fields 838(1) through 838(N) (e.g., 8-16 bytes) (collectively referenced as model data fields 838). The model update message 830 may end with an error check code, such as a cyclical redundancy check field 840 (e.g., 4-8 bytes), which follows the last model data field 838(N).

One example of the format of a message generated by the WWAN modem in response to an update message 830 is shown at update acknowledgment message 842. In this example, the update acknowledgment message 842 begins with a header 844 (e.g., 2 bytes), which provides a list of technical details about the message, such as an identification of the thermal model optimization server to which the message is directed, an identification of the WWAN modem sending the update message, a timestamp, etc. The header 844 is followed by a reference identification number field 846 (e.g., 4-8 bytes) containing the same reference identification number as included in the reference identification number field 834 of update message 830.

In certain embodiments, the reference identification number field 846 is followed by one or more update result fields 848 (e.g., 8-16 bytes). The update result fields 848 may include information indicating whether the WWAN modem successfully updated its thermal AI/ML model. In certain embodiments, the update result fields 848 may include an acknowledgment that the WWAN modem successfully updated its thermal AI/ML model. In certain embodiments, the update result fields 848 may include error codes indicating the type of error encountered by the WWAN modem in updating its AI/ML model. For example, the error codes may indicate that the WWAN modem already has the version of the thermal AI/ML model transmitted in the update message 830 and, therefore, has not updated its thermal AI/ML model. In another example, the error codes may indicate that the thermal model optimization server should resend one or more portions of the model update message 830. Other types of error codes may also be provided in the update result fields 848.

In certain embodiments, the update result fields 848 are followed by one or more optional fields 850 (e.g., 8-16 bytes). The update acknowledgment message 842 may end with an error check code, such as a cyclical redundancy check field 852 (e.g., 4-8 bytes), which follows the last optional field 850.

Figure 9:
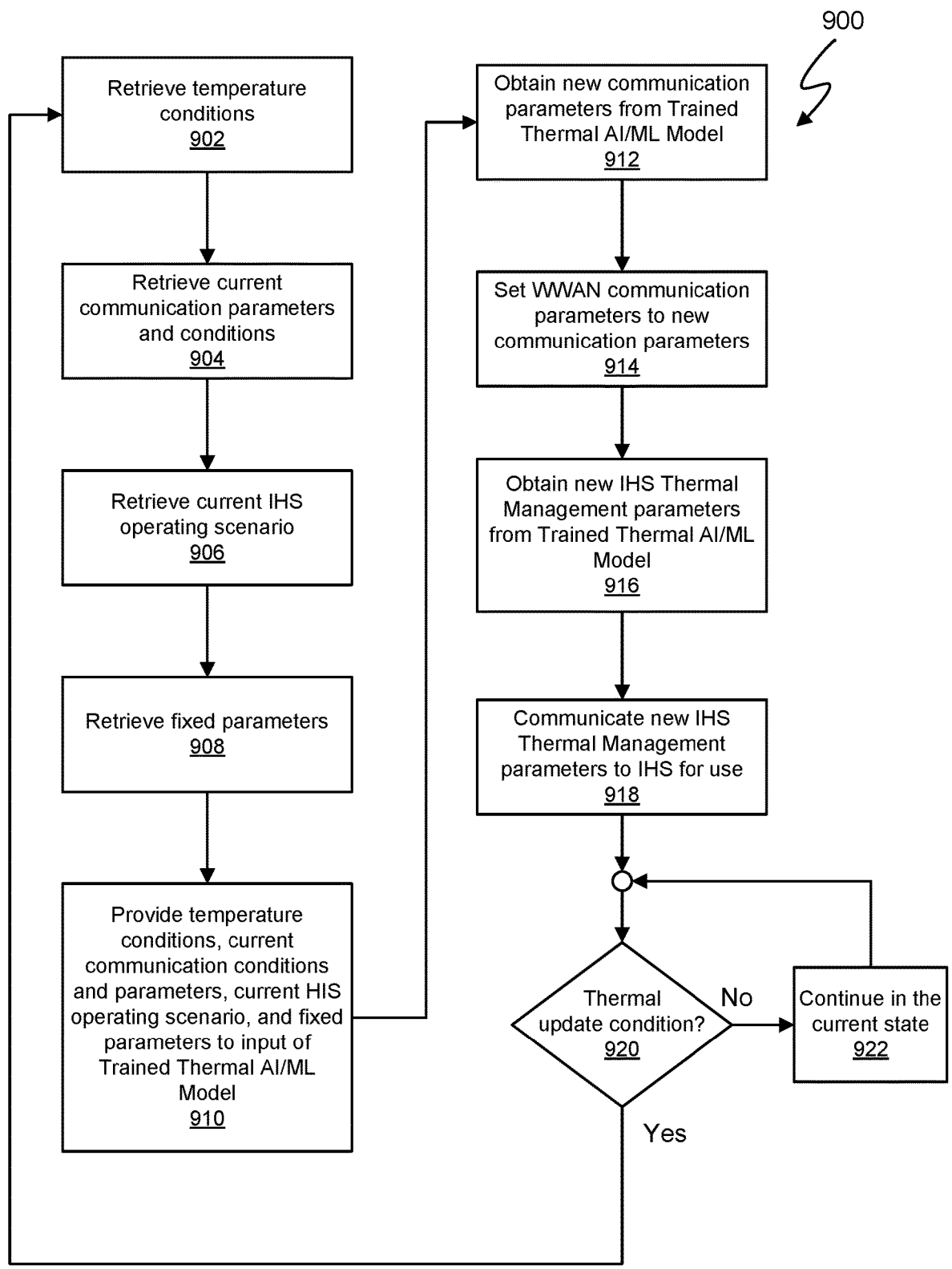
FIG. 9 is a flowchart showing exemplary operations that may be executed during thermal management of a WWAN modem.

FIG. 9 is a flowchart 900 showing exemplary operations that may be executed during thermal management of a WWAN modem. In this example, temperature conditions, such as those described herein, are retrieved at operation 902. The current communication parameters and conditions, such as those described herein, are retrieved at operation 904. Information relating to the current IHS operating scenario, such as those described herein, are retrieved at operation 906, and fixed parameters, such as those described herein, are retrieved at operation 908. At operation 910, the temperature conditions, current communication conditions and parameters, current HIS operating scenario, and fixed parameters are provided to the input of the trained thermal AI/ML model of the WWAN modem.

The trained thermal AI/ML model generates a new set of recommended communication parameters in response to the information provided at operation 910. The new set of recommended communication parameters is obtained at operation 912. At operation 914, the WWAN modem is set to implement one or more communication parameters of the new set of recommended communication parameters.

In certain embodiments, the trained thermal AI/ML model also generates a new set of IHS thermal management parameters. The IHS thermal management parameters may be obtained from the trained thermal AI/ML model at operation 916 and communicated to the IHS for use at operation 918.

At operation 920, the WWAN modem determines whether predetermined criteria have been met to generate another new set of recommended communication parameters. The exemplary criterion may include 1) generating another new set of recommended communication parameters following a predetermined schedule, 2) generating another new set of recommended communication parameters based on the time that has elapsed since the last set of recommended communication parameters was generated, 3) generating a new set of recommended communication parameters in response to one or more temperature conditions reaching a predetermined threshold, 4) generating a new set of recommended communication parameters in response to a predetermined degree of change in one or more temperature conditions, 5) generating a new set of recommended medication parameters in response to a change in the IHS operating scenario, etc. It will be recognized, based on the teachings of the present disclosure, that the foregoing criterion constitute non-limiting examples of such criterion and that a greater number, fewer number, or different criterion may be utilized for instantiating the generation of another new set of recommended communication parameters.

If the update condition is not met at operation 920, the WWAN modem continues to operate in its current state at operation 922. Otherwise, if the update condition criterion indicate that a new set of recommended communication parameters is to be generated, the generation of the new set of recommended communication parameters is instantiated by a return to operation 902.

Figure 10:
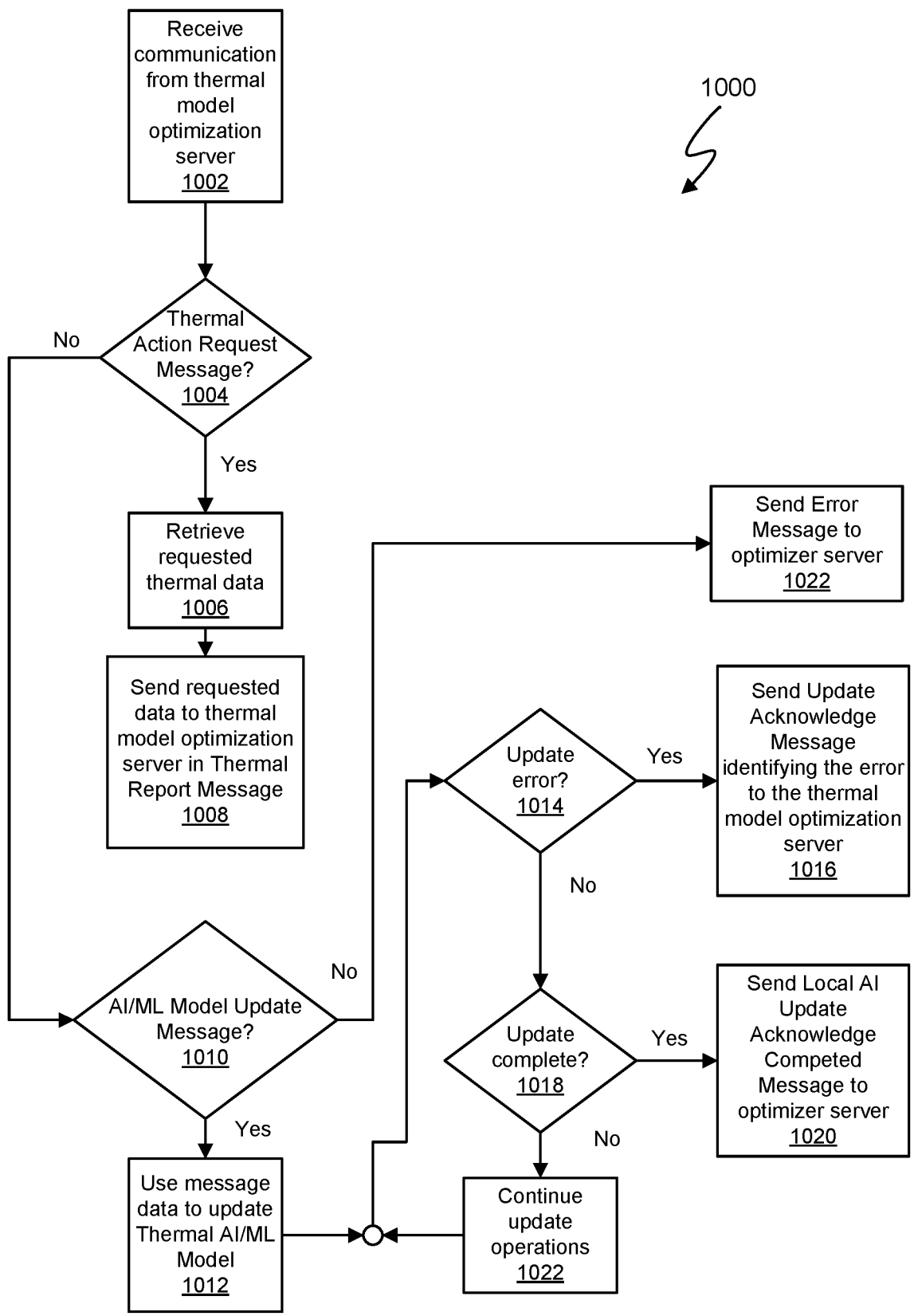
FIG. 10 is a flowchart showing exemplary operations that may be executed in response to a communication from the thermal model optimization server.

FIG. 10 is a flowchart 1000 showing exemplary operations that may be executed in response to a communication from the thermal model optimization server. In this example, a communication is received from the thermal model optimization server at operation number 1002. A determination is made at operation 1004 as to whether the communication was a thermal action request message. If a thermal action request message has been received, the requested thermal data is retrieved at operation 1006 and included in a thermal report message sent to the thermal model optimization server.

If the received communication is not a thermal action request message, a determination is made as to whether the communication is an AI/ML model update message. If the communication is an AI/ML model update message, the model data in the update message is used by the WWAN modem to update its thermal AI/ML model at operation 1012. At operation role 1014, a determination is made as to whether the WWAN modem encountered an error in the update process. If an error occurred, the WWAN modem sends an update acknowledgment message identifying the error to the thermal model optimization server at operation number 1016. If an error was not encountered, a determination is made at operation 1018 as to whether the WWAN modem has successfully completed the update of its thermal AI/ML model. If the update process is not completed, the WWAN modem continues execution of the update operations at operation 1022. However, if the update process has been successfully completed as determined at operation 1018, the WWAN modem sends an update acknowledgment message to the thermal model optimization server indicating the successful completion of model update at operation 1020.

Figure 11:
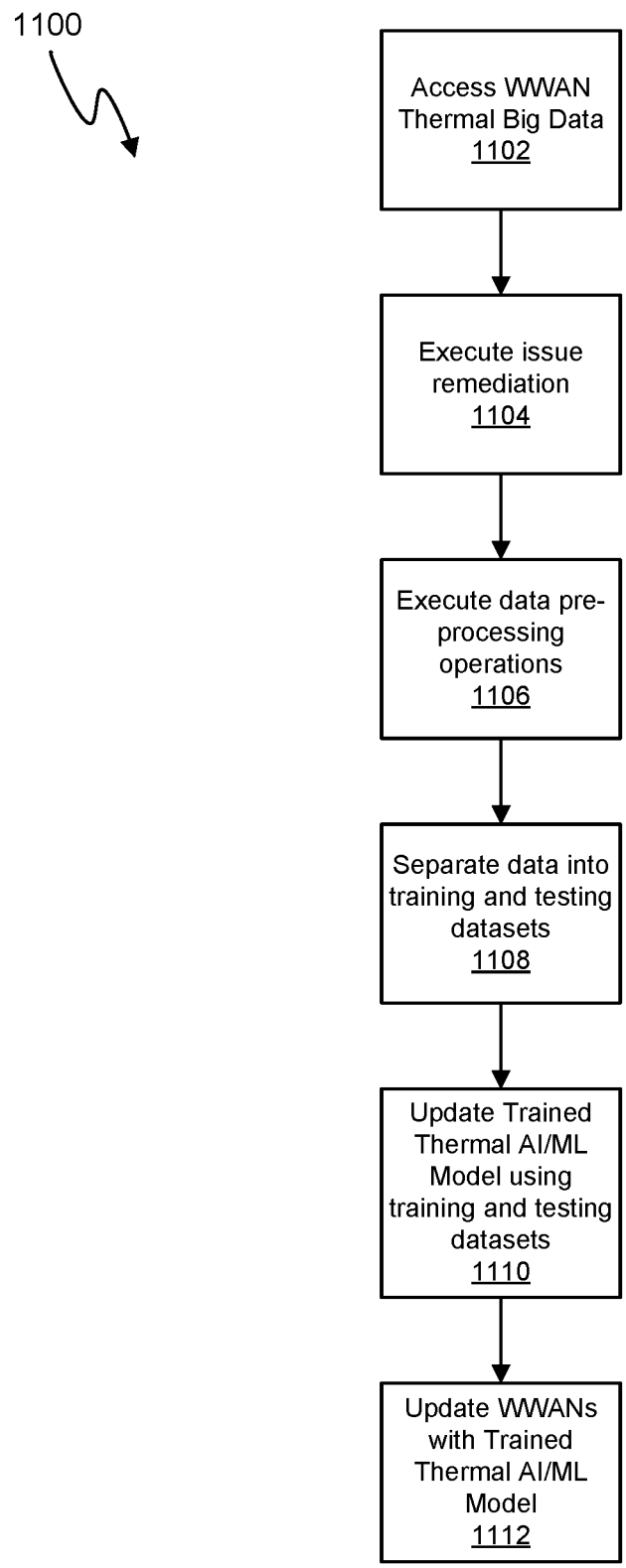
FIG. 11 is a flowchart showing exemplary operations that may be executed by a thermal model optimization server.

FIG. 11 is a flowchart 1100 showing exemplary operations that may be executed by the thermal model optimization server. In this example, the WWAN thermal big data is accessed at operation 1102. Issue remediation operations on the excess data takes place at operation 1104. At operation 1106, the remediated data is subject to data pre-processing operations and is separated into separate training and testing datasets at operation 1108. The thermal AI/ML model is updated at operation 1110 using the training and testing datasets and is deployed to corresponding WWAN modems at operation 1112.

In certain embodiments, the messages transmitted by the thermal model optimization server are limited to thermal action request messages and AI/ML model update messages. Accordingly, if the communication received from the thermal model optimization server is neither a thermal action request message nor AI/ML model update message, the WWAN modem sends an error message to this effect to the thermal model optimization server at operation 1022.

As will be appreciated by one skilled in the art, the disclosed system may be embodied as a method, system, or computer program product. Accordingly, embodiments of the disclosed system may be implemented in hardware, in software (including firmware, resident software, microcode, etc.) or in an embodiment combining software and hardware. Furthermore, the disclosed system may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the disclosed system may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the disclosed system are described with reference to flowchart illustrations and/or block diagrams of methods, apparatus (systems) and computer program products according to embodiments of the disclosed system. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the disclosed system has been depicted, described, and is defined by reference to particular embodiments, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention. Consequently, the invention is intended to be limited only by the spirit and scope of the appended claims, giving full cognizance to equivalents in all respects.

What is claimed is:

1. A computer-implemented method comprising:
   detecting temperature conditions associated with operation of a Wireless Wide Area Network (WWAN) modem in an information handling system;
   detecting current communication conditions of the WWAN modem;
   providing the detected temperature conditions and current communication conditions to an input of a trained thermal artificial intelligence/machine learning (AI/ML) model;
   generating new communication parameters using the trained thermal AI/ML model at an output of the trained thermal AI/ML model, wherein the new communication parameters are generated by the trained thermal AI/ML model using the detected temperature conditions and current communication conditions provided to the input of the trained thermal AI/ML model; and
   setting the WWAN modem to operate using one or more of the new communication parameters.

2. The computer-implemented method of claim 1, wherein the detected temperature conditions associated with operation of the WWAN modem include one or more of:
   an ambient temperature of an operating environment proximate the WWAN modem;
   a change in the ambient temperature of the operating environment proximate the WWAN modem over time;
   device temperatures of hardware components of the WWAN modem; and
   a change in device temperatures of the hardware components of the WWAN modem over time.

3. The computer-implemented method of claim 1, wherein the detected current communication conditions of the WWAN modem include one or more of:
   a communication mode of the WWAN modem;
   a modulation coding scheme used by the WWAN modem;
   a duty cycle in use for communications transmitted by the WWAN modem;
   a channel in use by the WWAN modem;
   a transmit power level in use for communications transmitted by the WWAN modem;
   a data throughput of current communications transmitted by the WWAN modem;
   a signal quality of a serving cell currently used by the WWAN modem;
   a distance between the WWAN modem and the serving cell currently used by the WWAN modem;
   a signal quality of a neighboring cell that may be used by the WWAN modem;
   a mobility mode of the WWAN modem;
   a status of the WWAN modem; and
   a name of a network to which the WWAN modem is connected.

4. The computer-implemented method of claim 3, wherein the new communication parameters provided at the output of the trained thermal AI/ML model include one or more of:
   a recommended communication mode for use by the WWAN modem;
   a recommended duty cycle for use in communications by the WWAN modem;
   a recommended modulation coding scheme for use in communications by the WWAN modem;
   a recommended transmit power level for use in communications by the WWAN modem;
   a recommended shutdown of the radio functions of the WWAN modem; and a carrier aggregation technique for use in communications by the WWAN modem.

5. The computer-implemented method of claim 1, further comprising:
   detecting conditions associated with an operating scenario of the information handling system; and
   providing the detected conditions associated with the operating scenario to the input of the trained thermal AI/ML model; and
   using, by the trained thermal AI/ML model, the detected conditions associated with the operating scenario to obtain the new communication parameters from an output of the trained thermal AI/ML model.

6. The computer-implemented method of claim 5, wherein the detected conditions associated with the operating scenario of the information handling system include one or more of:
   applications currently running on the information handling system;
   software drivers used by the information handling system;
   operating system used by the information handling system;
   speed of a cooling fan of the information handling system;
   speed of one or more central processing units used by the information handling system;
   speed of one or more graphics processing units used by the information handling system;
   an ambient temperature of the information handling system; and
   a change in the ambient temperature of the information handling system over time.

7. The computer-implemented method of claim 5, further comprising:
   obtaining new operating scenario conditions for use by the information handling system from the output of the trained thermal AI/ML model, wherein the new operating scenario conditions include one or more of:
      a recommended speed for a cooling fan of the information handling system;
      a recommended speed for operation of one or more central processing units of the information handling system; and
      a recommended speed for operation of one or more graphics processing units of the information handling system.

8. The computer-implemented method of claim 1, further comprising:
   providing fixed parameters associated with the WWAN modem and information handling system to the input of the trained thermal AI/ML model, wherein the fixed parameters include one or more of
      an identification of a model of the WWAN modem,
      identification of hardware components of the WWAN modem,
      identification of a model of the information handling system; and
   generating the new communication parameters using the trained thermal AI/ML model at an output of the trained thermal AI/ML model using one or more of the fixed parameters.

9. A wireless wide area network (WWAN) modem comprising:
   a processor; and
   a non-transitory, computer-readable storage medium embodying computer program code including instructions that are executable by the processor and configured for:
      detecting temperature conditions associated with operation of the WWAN modem in an information handling system;
      detecting current communication conditions of the WWAN modem;
      providing the detecting temperature conditions and current communication conditions to an input of a trained thermal artificial intelligence/machine learning (AI/ML) model;
      generating new communication parameters using the trained thermal AI/ML model at an output of the trained thermal AI/ML model, wherein the new communication parameters are generated by the trained thermal AI/ML model using the detected temperature conditions provided to the input of the trained thermal AI/ML model; and
      setting the WWAN modem to operate using one or more of the new communication parameters.

10. The WWAN modem of claim 9, wherein the detected temperature conditions associated with operation of the WWAN modem include one or more of:
    an ambient temperature of an operating environment proximate the WWAN modem;
    a change in the ambient temperature of the operating environment proximate the WWAN modem over time;
    device temperatures of hardware components of the WWAN modem; and
    a change in device temperatures of the hardware components of the WWAN modem over time.

11. The WWAN modem of claim 9, wherein the detected current communication conditions of the WWAN modem include one or more of:
    a communication mode of the WWAN modem;
    a modulation coding scheme used by the WWAN modem;
    a duty cycle in use for communications transmitted by the WWAN modem;
    a channel in use by the WWAN modem;
    a transmit power level in use for communications transmitted by the WWAN modem;
    a data throughput of current communications transmitted by the WWAN modem;
    a signal quality of a serving cell currently used by the WWAN modem;
    a distance between the WWAN modem and the serving cell currently used by the WWAN modem;
    a signal quality of a neighboring cell that may be used by the WWAN modem;
    a mobility mode of the WWAN modem;
    a status of the WWAN modem;
    radio shutdown of the WWAN modem; and
    a name of a network to which the WWAN modem is connected.

12. The WWAN modem of claim 11, wherein the new communication parameters provided at the output of the trained thermal AI/ML model include one or more of:
    a recommended communication mode for use by the WWAN modem;
    a recommended duty cycle for use in communications by the WWAN modem;
    a recommended modulation coding scheme for use in communications by the WWAN modem;
    a recommended transmit power level for use in communications by the WWAN modem;
    a recommended shutdown of the radio of the WWAN modem;
    a recommended radio shutdown of the WWAN modem; and a carrier aggregation technique for use in communications by the WWAN modem.

13. The WWAN modem of claim 9, wherein the instructions are further configured for:
   detecting conditions associated with an operating scenario of the information handling system; and
   providing the detected conditions associated with the operating scenario to the input of the trained thermal AI/ML model; and
   using, by the trained thermal AI/ML model, the detected conditions associated with the operating scenario to obtain the new communication parameters from an output of the trained thermal AI/ML model.

14. The WWAN modem of claim 13, wherein the detected conditions associated with the operating scenario of the information handling system include one or more of:
   applications currently running on the information handling system;
   software drivers used by the information handling system;
   operating system used by the information handling system;
   speed of a cooling fan of the information handling system;
   speed of one or more central processing units used by the information handling system;
   speed of one or more graphics processing units used by the information handling system;
   an ambient temperature of the information handling system; and
   a change in the ambient temperature of the information handling system over time.

15. The WWAN modem of claim 13, wherein the instructions are further configured for:
   obtaining new operating scenario conditions for use by the information handling system from the output of the trained thermal AI/ML model, wherein the new operating scenario conditions include one or more of:
      a recommended speed for a cooling fan of the information handling system;
      a recommended speed for operation of one or more central processing units of the information handling system; and
      a recommended speed for operation of one or more graphics processing units of the information handling system.

16. The WWAN modem of claim 9, wherein the instructions are further configured for:
   providing fixed parameters associated with the WWAN modem and information handling system to the input of the trained thermal AI/ML model, wherein the fixed parameters include one or more of
      an identification of a model of the WWAN modem,
      identification of hardware components of the WWAN modem,
      identification of a model of the information handling system; and
      generating the new communication parameters using the trained thermal AI/ML model at an output of the trained thermal AI/ML model using one or more of the fixed parameters.

17. A non-transitory, computer-readable medium embodying computer program code, the computer program code comprising computer-executable instructions configured for:
   detecting temperature conditions associated with operation of a Wireless Wide Area Network (WWAN) modem in an information handling system;
   detecting current communication conditions of the WWAN modem;
   providing the detected temperature conditions and current communication conditions to an input of a trained thermal artificial intelligence/machine learning (AI/ML) model;
   generating new communication parameters using the trained thermal AI/ML model at an output of the trained thermal AI/ML model, wherein the new communication parameters are generated by the trained thermal AI/ML model using the detected temperature conditions and current communication conditions provided to the input of the trained thermal AI/ML model; and
   setting the WWAN modem to operate using one or more of the new communication parameters.

18. The non-transitory, computer-readable storage medium of claim 17, wherein the detected temperature conditions associated with operation of the WWAN modem include one or more of:
   an ambient temperature of an operating environment proximate the WWAN modem;
   a change in the ambient temperature of the operating environment proximate the WWAN modem over time;
   device temperatures of hardware components of the WWAN modem; and
   a change in device temperatures of the hardware components of the WWAN modem over time.

19. The non-transitory, computer-readable storage medium of claim 17, wherein the detected current communication conditions of the WWAN modem include one or more of:
   a communication mode of the WWAN modem;
   a modulation coding scheme used by the WWAN modem;
   a duty cycle in use for communications transmitted by the WWAN modem;
   a channel in use by the WWAN modem;
   a transmit power level in use for communications transmitted by the WWAN modem;
   a data throughput of current communications transmitted by the WWAN modem;
   a signal quality of a serving cell currently used by the WWAN modem;
   a distance between the WWAN modem and the serving cell currently used by the WWAN modem; and
   a signal quality of a neighboring cell that may be used by the WWAN modem;
   a mobility mode of the WWAN modem;
   a status of the WWAN modem;
   a radio shutdown of the WWAN modem; and
   a name of a network to which the WWAN modem is connected.

20. The non-transitory, computer-readable storage medium of claim 19, wherein the new communication parameters provided at the output of the trained thermal AI/ML model include one or more of:
   a recommended communication mode for use by the WWAN modem;
   a recommended duty cycle for use in communications by the WWAN modem;
   a recommended modulation coding scheme for use in communications by the WWAN modem;
   a recommended transmit power level for use in communications by the WWAN modem;
   a recommended shutdown of the radio of the WWAN modem; and a carrier aggregation technique for use in communications by the WWAN modem.

\* \* \* \* \*